United States Patent [19]

Hsu

[11] 4,332,856
[45] Jun. 1, 1982

[54] CARBON OR GRAPHITE ARTICLE AND METHOD OF MAKING BY IMPREGNATING WITH A LIGNIN SULFONATE COMPLEX

[75] Inventor: Harry L. Hsu, Johnson City, Tenn.

[73] Assignee: Great Lakes Carbon Corporation, New York, N.Y.

[21] Appl. No.: 192,069

[22] Filed: Sep. 29, 1980

[51] Int. Cl.³ ............................................. B32B 9/00
[52] U.S. Cl. ................................... 428/408; 428/532; 428/533; 427/113; 427/114; 427/223
[58] Field of Search ................... 428/408, 532, 533; 427/113, 114, 223

[56] References Cited

U.S. PATENT DOCUMENTS

| 935,180 | 9/1909 | Williamson | 428/408 X |
| 1,566,409 | 12/1925 | Lavene | 427/113 X |
| 3,342,627 | 9/1967 | Paxton et al. | 427/113 X |

OTHER PUBLICATIONS

"The Orzan Products", Crown Zellerbach Product Information Bulletin, 311–317.

*Primary Examiner*—P. Ives
*Attorney, Agent, or Firm*—R. Laddie Taylor

[57] ABSTRACT

In a process for producing carbon or graphite articles, baked carbonaceous articles are impregnated with an aqueous solution of lignin sulfonate complex prior to carbonization or graphitization. The carcinogenic effects of conventional impregnants are eliminated, and impregnation temperatures are lowered significantly.

12 Claims, No Drawings

CARBON OR GRAPHITE ARTICLE AND METHOD OF MAKING BY IMPREGNATING WITH A LIGNIN SULFONATE COMPLEX

DESCRIPTION

BACKGROUND OF THE INVENTION

1. Field Of The Invention

The invention relates to improved carbon and graphite articles and a method for making them. Principally, it concerns a noncarcinogenic agent for use in the impregnation step of the carbon or graphite production process, and articles resulting from the use thereof.

2. Description Of The Prior Art

In the manufacture of carbon and graphite electrodes and other carbon and graphite bodies, carbon filler material is mixed with a carbonaceous binder, such as coal tar pitch, and the mixture is formed into desired shapes, for example by extrusion or molding. The bodies thus obtained are baked to high temperatures, typically up to about 900° C., to carbonize the binder and set the mass. The baked bodies may then be heated at temperatures above 2000° C. to effect graphitization.

If desired, the baked bodies may be densified prior to graphitization by impregnation, conventionally with petroleum pitch or the like, the impregnation step comprising preheating the bodies, typically at temperatures in the range of about 275°-300° C., and then impregnating the heated bodies at temperatures of about 225°-250° C. The impregnated bodies may be rebaked prior to graphitization to carbonize the impregnant. Optionally, the impregnation and rebaking steps may be repeated.

For some purposes, the baked articles may be graphitized prior to impregnation, optionally followed by rebaking and regraphitizing.

Until the present invention, only impregnants of petroleum or coal origin were known in the carbon and graphite article production art. A disadvantage of using these impregnants is that they contain polynuclear aromatic hydrocarbons which are known carcinogens in humans (Sax, *Dangerous Properties Of Industrial Materials*, Fourth Edition, 1975, pp. 279, 564 and 1006). Therefore, avoidance of the use of these types of impregnants in the carbon or graphite industry would tend to decrease the danger of the working environment in and around the impregnation facility of the production plant. Additionally, the high temperatures required for the conventional impregnation process, including preheating, are undesirable.

SUMMARY OF THE INVENTION

The invention provides carbon or graphite articles and a method for producing such articles wherein the disadvantages of using a petroleum or coal derived impregnant are overcome. The method for making the articles generally comprises forming a mixture of carbon filler, such as particles of calcined petroleum coke, calcined anthracite, graphite or the like, and carbonaceous binder, such as coal tar pitch, baking the formed mixture to produce a carbon body, impregnating the carbon body with an impregnation agent, and carbonizing or graphitizing the impregnated body, wherein the impregnation agent consists essentially of an aqueous solution of a lignin sulfonate complex. Preferably, the aqueous solution contains about 40 to 60 wt. % dissolved solids, and more preferably about 50 wt. % dissolved solids.

If increased physical properties are desired, the impregnated carbon body may be rebaked, typically at temperatures in the range of about 720°-800° C., to carbonize the impregnant prior to graphitization. The steps of impregnation and rebaking may be repeated if desired.

Alternately, the carbon body may be graphitized prior to impregnation, optionally followed by rebaking and regraphitizing.

Due to the nature of the impregnation agent, the bodies are preheated and impregnated at temperatures below about 105° C., preferably in the range of about 90° C.–100° C.

The lignin sulfonate complex employed in the production of the aqueous impregnation solution of the invention is typically a free-flowing spray-dried powder of about 90–96% dry substance derived as a by-product from the digestion of wood chips under pressure in a solution of sulfurous acid and ammonium bisulfite or a metallic sulfite, e.g., calcium. The calcium constituent of calcium lignin sulfonate may be precipitated by the addition of sulfates of other cations to form sodium, aluminum, zinc, iron, chromium and other lignin sulfonates.

The complex is essentially lignin sulfonate containing small amounts of natural sugars, which are present in fixed proportions, and typically comprise mannose, glucose, xylose and galactose. Various salts of the complex are sold under several trade names, for example the trademarks Orzan (Crown Zellerbach Company), Norlig (American Can Company) and Totanin (A/S Toten Cellulosefabrik Company). Selected salts are also commercially available as aqueous solutions containing, for example, 50–55 wt. % dissolved solids. These solutions may be directly used as the impregnation agents of the invention. The Orzan ® products are described in Crown Zellerback Products Information Bulletin 311-17.

The term "solution" is used throughout the specification and claims to describe the aqueous lignin sulfonate impregnant. In this context, solution is construed to include the term "slurry", which is also used by some in the art to describe such an aqueous complex.

DESCRIPTION OF THE PREFERRED EMBODIMENT

The following example will further describe the invention. It is understood that this example is provided to illustrate the practice of the preferred embodiment of the invention and is not intended as limiting beyond the limitations imposed in the appended claims.

Calcined premium petroleum coke was crushed and screened in a manner to provide a particle size distribution of about 68 parts per hundred between about 3 mesh and 35 mesh (Tyler Screen Scale) and about 32 parts per hundred flour (particle size about 50% below 200 mesh). The sized coke was mixed in standard manner with coal tar pitch binder having a softening temperature of 110° C. at a mixing temperature of about 150° C. and a binder level of about 26 parts per hundred parts coke by weight. The resulting mixture was formed into round billets having a diameter of approximately 14 cm and a length of about 46 cm by extrusion and cutting, and then baked for about six days to a final temperature of about 720° C. The baked billets were preheated to a temperature of about 95° C. and then impregnated with an aqueous solution of Orzan ® ammonium lignin sulfonate complex containing about 50 wt. % dissolved solids by means known in the art, using a single vacuum-pressure cycle at a temperature in the range of about 95°–100° C., with vacuum being drawn on the billets for about 1.5 hours, followed by pressure in the range of about 6.3–7.0 kg/cm$^2$ for about 1 hour. The impregnated billets were dried at a temperature of 105° C. for about 3 hours, and then at 150° C. for about 7 hours, to remove moisture therefrom. Finally, the dried impregnated billets were graphitized in the conventional manner known in the art in a tube graphitizer to a final temperature of about 2700° C.

Average properties of the resulting graphitized bodies are presented in the Table below. For comparison, properties of control graphite bodies produced in the same manner described above without the impregnation step are also shown. The L and T notations denote properties measured in the longitudinal and transverse directions, respectively, of extrusion.

| PROPERTY | | CONTROL | ACCORDING TO THE INVENTION |
|---|---|---|---|
| Apparent Density | L | 1.58 | 1.65 |
| (g/cc) | T | 1.58 | 1.64 |
| Electrical Resistivity | | | |
| (ohms/cm × 10$^{-4}$) | L | 10.3 | 7.5 |
| | T | 17.1 | 11.9 |
| Modulus of Rupture | L | 62.3 | 101.5 |
| (kg/cm$^2$) | T | 41.0 | 64.4 |
| Modulus of Elasticity | | | |
| (g/cm$^2$ × 10$^6$) | L | 62.6 | 94.2 |
| | T | 29.5 | 47.8 |

It is evident from the data that impregnating baked carbon bodies with an aqueous solution of ammonium lignin sulfonate complex prior to graphitization substantially improves the properties of the final product without the health risks imposed by the use of impregnants of petroleum or coal origin.

While the invention has been described in detail and with reference to a specific embodiment thereof, it will be apparent to one skilled in the art that various changes and modifications can be made therein without departing from the scope and spirit thereof, and, therefore, the invention is not intended to be limited except as indicated in the appended claims.

What is claimed is:

1. In a process for producing a carbon or graphite article by forming a mixture of carbon filler and carbonaceous binder, baking the formed mixture to produce a carbon body, impregnating the carbon body with an impregnation agent, and carbonizing or graphitizing the impregnated carbon body, the improvement wherein said impregnation agent consists essentially of an aqueous solution of a lignin sulfonate complex.

2. In a process for producing a graphite article by forming a mixture of coke filler and carbonaceous binder, baking the formed mixture to produce a carbon body, impregnating the carbon body with an impregnation agent, rebaking the impregnated body to carbonize the impregnant and graphitizing the rebaked impregnated carbon body, the improvement wherein said impregnation agent consists essentially of an aqueous solution of a lignin sulfonate complex.

3. In a process for producing a graphite article by forming a mixture of carbon filler and carbonaceous binder, baking the formed mixture to produce a carbon body, graphitizing the carbon body, impregnating the graphitized body with an impregnation agent and carbonizing the impregnated body, the improvement wherein the impregnation agent consists essentially of an aqueous solution of a lignin sulfonate complex.

4. A process according to claim 3 wherein the impregnated graphitized body is regraphitized.

5. A process according to claims 1, 2, 3 or 4 wherein said impregnation agent consists essentially of an aqueous solution of ammonium lignin sulfonate complex.

6. A process according to claims 1, 2, 3 or 4 wherein said impregnation agent consists essentially of an aqueous solution of calcium lignin sulfonate complex.

7. A process according to claims 1, 2, 3 or 4 wherein said impregnation agent consists essentially of an aqueous solution containing about 40 to 60 wt. % dissolved solids.

8. A process according to claims 1, 2, 3 or 4 wherein said impregnation agent consists essentially of an aqueous solution containing about 50 wt. % dissolved solids.

9. In a process for producing a graphite article for forming a mixture of coke filler and carbonaceous binder, baking the formed mixture to produce a carbon body, impregnating the carbon body with an impregnation agent, and graphitizing the impregnated carbon body, the improvement wherein said impregnation agent consists essentially of an aqueous solution of ammonium lignin sulfonate complex containing about 50 wt. % dissolved solids.

10. A process for improving the properties of a carbon or graphite article comprising impregnating said article with an impregnating agent consisting essentially of an aqueous solution of a lignin sulfonate complex, and then carbonizing or graphitizing the impregnated article.

11. A carbon or graphite article prepared by forming a mixture of carbon filler and carbonaceous binder, baking the formed mixture to produce a carbon body, impregnating the carbon body with an impregnation agent, and carbonizing or graphitizing the impregnated carbon body, the improvement wherein said impregnation agent consists essentially of an aqueous solution of a lignin sulfonate complex.

12. A graphite article prepared by forming a mixture of coke filler and carbonaceous binder, baking the formed mixture to produce a carbon body, impregnating the carbon body with an impregnation agent, and graphitizing the impregnated carbon body, the improvement wherein said impregnation agent consists essentially of an aqueous solution of ammonium lignin sulfonate complex containing about 50 wt. % dissolved solids.

* * * * *